US012301318B2

(12) United States Patent
Petropulu et al.

(10) Patent No.: US 12,301,318 B2
(45) Date of Patent: May 13, 2025

(54) REINFORCEMENT LEARNING FOR MOTION POLICIES IN MOBILE RELAYING NETWORKS

(71) Applicant: Rutgers, The State University of New Jersey, New Brunswick, NJ (US)

(72) Inventors: Athina Petropulu, Piscataway, NJ (US); Spilios Evmorfos, Highland Park, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 458 days.

(21) Appl. No.: 17/888,411

(22) Filed: Aug. 15, 2022

(65) Prior Publication Data
US 2023/0081408 A1    Mar. 16, 2023

Related U.S. Application Data

(60) Provisional application No. 63/233,306, filed on Aug. 15, 2021.

(51) Int. Cl.
*H04W 4/00* (2018.01)
*G06N 3/045* (2023.01)
*G06N 3/048* (2023.01)
*H04B 7/06* (2006.01)
*H04B 17/336* (2015.01)

(52) U.S. Cl.
CPC .......... *H04B 7/0617* (2013.01); *G06N 3/045* (2023.01); *G06N 3/048* (2023.01); *H04B 17/336* (2015.01)

(58) Field of Classification Search
CPC .. H04B 7/0617; H04B 17/336; H04B 7/0456; H04B 7/026; G06N 3/045; G06N 3/048; G06N 3/006; G06N 3/092
See application file for complete search history.

(56) References Cited

U.S. PATENT DOCUMENTS

| | | | |
|---|---|---|---|
| 11,069,082 B1* | 7/2021 | Ebrahimi Afrouzi .. | H04N 23/56 |
| 2008/0062909 A1* | 3/2008 | Shin ...................... | H04L 1/0041 370/315 |
| 2008/0225774 A1* | 9/2008 | Kim ...................... | H04L 5/0037 370/336 |
| 2011/0110290 A1* | 5/2011 | Erkip ..................... | H04B 7/026 370/315 |
| 2020/0033869 A1* | 1/2020 | Palanisamy ......... | B60W 60/001 |
| 2021/0089040 A1* | 3/2021 | Ebrahimi Afrouzi ........................ G05D 1/0248 |

OTHER PUBLICATIONS

Tahir, A. et al., "Swarms of Unmanned Aerial Vehicles—A Survey", Journal of Industrial Information Integration, vol. 16, pp. 100-106, Dec. 1, 2019.

(Continued)

Primary Examiner — Atique Ahmed
(74) Attorney, Agent, or Firm — MEAGHER EMANUEL LAKS GOLDBERG & LIAO, LLP

(57) ABSTRACT

Various embodiments comprise systems, methods, architectures, mechanisms or apparatus for determining a subsequent time slot position for each of a plurality of spatially distributed relays configured for time slot based beamforming supporting a communication channel between a source and a destination.

19 Claims, 5 Drawing Sheets

(56) References Cited

OTHER PUBLICATIONS

Siebart, S. and Teizer, J., "Mobile 3D mapping for surveying earthwork projects using an Unmanned Aerial Vehicle (UAV) system", Automation in Construction, vol. 41, pp. 1-14, Aug. 11, 2013.
Mnih, V. et al., "Playing Atari with Deep Reinforcement Learning", DeepMind Technologies, arXiv:1312.5602v1, Dec. 19, 2013.
Huang, Y. et al., "Online Maneuver Design for UAV-Enabled NOMA Systems via Reinforcement Learning", 2020 IEEE Wireless Communications and Networking Conference (WCNC), pp. 1-6, Aug. 12, 2019.
Cao, Y. et al., "Towards Understanding the Spectral Bias of Deep Learning", International Joint Conference on Artificial Intelligence, Sep. 25, 2019.
Scherer, J. et al., "An Autonomous Multi-UAV System for Search and Rescue", DroNet'15, Association for Computing Machinery, May 18, 2015.
Söderström, T., "On the Convergence Properties of the Generalized Least Squares Identification Method," Automatica, vol. 10, No. 6, pp. 617-626, Dec. 1974.
Jung, H. et al., "A Relay Selection Scheme Using Q-Learning Algorithm in Cooperative Wireless Communications", Asia-Pacific Conference on Communications, IEEE, pp. 7-11, Dec. 24, 2012.
Su, Y. et al., "Cooperative Communications With Relay Selection Based on Deep Reinforcement Learning in Wireless Sensor Networks", IEEE Sensors Journal, vol. 19, No. 20, pp. 9561-9569, Oct. 15, 2019.
Li, J. et al., "Cooperative Transmission for Relay Networks Based on Second-Order Statistics of Channel State Information", IEEE Transactions on Signal Processing, vol. 59, No. 3, pp. 1280-1291, May 28, 2010.
Havary-Nassab, V. et al., "Distributed Beamforming for Relay Networks Based on Second-Order Statistics of the Channel State Information", IEEE Transactions on Signal Processing, vol. 56, No. 9, pp. 4306-4316, Sep. 1, 2008.
Adam, S. et al., "Experience Replay for Real-Time Reinforcement Learning Control", IEEE Transactions on Systems, Man, and Cybernetics—Part C: Applications and Reviews, vol. 42, No. 2, pp. 201-212, Mar. 1, 2012.
Jadoon, M.A. and Kim, S., "Relay selection Algorithm for wireless cooperative networks: a learning-based approach", IET Communications, vol. 11, No. 7, pp. 1061-1066, May 25, 2017.
Park, J. et al., "Millimeter-Wave Channel Model Parameters for Urban Microcellular Environment Based on 28 and 38 GHz Measurements", 27th Annual IEEE International Symposium on Personal, Indoor and Mobile Radio Communications—(PIMRC): Fundamentals and PHY, pp. 1-5, Sep. 1, 2016.
Nasir, Y.S. and Guo, D., "Multi-Agent Deep Reinforcement Learning for Dynamic Power Allocation in Wireless Networks", IEEE Journal on Selected Areas in Communications, vol. 37, No. 10, pp. 2239-2250, Aug. 1, 2018.
Jacot, A. et al., "Neural Tangent Kernel: Convergence and Generalization in Neural Networks", 32nd Conference on Neural Information Processing Systems (NeurIPS), Jun. 20, 2018.
Tancik, M. et al., "Fourier Features Let Networks Learn High Frequency Functions in Low Dimensional Domains", Jun. 18, 2020.
Sitzmann, V. et al., "Implicit Neural Representations with Periodic Activation Functions", 34th Conference on Neural Information Processing Systems (NeurIPS), Jun. 12, 2020.
Biswas, S. et al., "On the Performance of Relay Aided Millimeter Wave Networks", IEEE Journal of Selected Topics in Signal Processing, vol. 10, No. 3, pp. 576-588, Apr. 1, 2016.
Liu, Y. and Petropulu, A.P., "On the Sumrate of Amplify-and-Forward Relay Networks with Multiple Source-Destination Pairs", IEEE Transactions on Wireless Communications, vol. 10, No. 11, pp. 3732-3742, Dec. 12, 2011.
Diamantaras, K. and Petropulu, A., "Optimal Mobile Relay Beamforming Via Reinforcement Learning", IEEE, pp. 1-6, Oct. 1, 2019.
Wei, N. et al., "Optimal Relay Probing in Millimeter-Wave Cellular Systems With Device-to-Device Relaying", IEEE Transactions on Vehicular Technology, vol. 65, No. 12, pp. 10218-10222, Oct. 8, 2015.
Zou, Y. et al., "Optimization-driven Hierarchical Deep Reinforcement Learning for Hybrid Relaying Communications", IEEE, pp. 1-6, May 2020.
MacCartney, Jr., G.R. et al., "Path Loss Models for 5G Millimeter Wave Propagation Channels in Urban Microcells", Globecom 2013—Wireless Communications Symposium, pp. 3948-3953, 2013.
Thi, M. et al., "Proportional Selection of Mobile Relays in Millimeter-Wave Heterogeneous Networks", IEEE Access, vol. 6, pp. 16081-16091, Apr. 18, 2018.
Dimas, A. et al., "Q-learning Based Predictive Relay Selection for Optimal Relay Beamforming", IEEE International Conference on Acoustics, Speech and Signal Processing, pp. 5030-5034, May 1, 2020.
Nguyen, L.D. et al., "Real-Time Deployment and Resource Allocation for Distributed UAV Systems in Disaster Relief", IEEE 20th International Workshop on Signal Processing Advances in Wireless Communications (SPAWC), pp. 1-5, Jul. 1, 2019.
Liu, X. et al., "Reinforcement Learning in Multiple-UAV Networks: Deployment and Movement Design", IEEE Transactions on Vehicular Technology, vol. 68, No. 8, Apr. 10, 2019.
Sutton, R.S. and Barto, A.G., Reinforcement Learning: An Introduction, The MIT Press, 1998.
Bertsekas, D.P., Reinforcement Learning and Optimal Control, Athena Scientific, Belmont, Massachusetts, 2019.
Kalogerias, D.S. and Petropulu, A.P., "Spatially Controlled Relay Beamforming", IEEE Transactions on Signal Processing, vol. 66, No. 24, pp. 6418-6433, Dec. 15, 2018.
Wang, R. et al., "Stationarity Region of Mm-Wave Channel Based on Outdoor Microcellular Measurements at 28 GHz", 2017 IEEE Military Communications Conference (MILCOM), Track 1—Waveforms and Signal Processing, pp. 782-787, Oct. 1, 2017.
Bayerlein, H. et al., "Trajectory Optimization for Autonomous Flying Base Station via Reinforcement Learning", 2018 IEEE 19th International Workshop on Signal Processing Advances in Wireless Communications (SPAWC), Kalamata, Greece, pp. 1-5, Jun. 1, 2018.
Li, R. et al., "UAV-Aided Two-Way Relaying for Wireless Communications of Intelligent Robot Swarms", IEEE Access, vol. 8, pp. 56141-56150, Mar. 9, 2020.
Goldsmith, A., Overview of Wireless Communications, Cambridge University Press, 2005.
Huang, Y. et al., "Reinforcement Learning for Maneuver Design in UAV-Enabled NOMA System with Segmented Channel", preprint arXiv:1908.03984, Aug. 11, 2019.

* cited by examiner

1. Initialize Experience Replay (ER)
2. Initialize $\theta^-$ and $\theta^+$
3. set update frequency
4. for all episodes all do
5.     for all relays do
6.         input $s$ to $Q_{policy}$
7.         get $Q_{policy}(s, a; \theta^+)\ \forall a$
8.         subtract $\mu = 1\%$ from $Q_{policy}(s, a; \theta^+)\ \forall a \neq stay$
9.         $\epsilon$-greedy choice of $a$, respecting grid boundaries and priority
10.        observe next state $s'$ and reward $r$
11.        store $\{s,a,s',r\}$ to ER
12.           $s = s'$
13.     end for
14.     sample a batch of tuples $\{s,a,s',r\}$ from ER
15.     for all tuples in the batch do
16.         input $s$ to $Q_{policy}$, get $Q_p = Q_{policy}(s, a; \theta^+)$
17.         input $s'$ to $Q_{target}$, get $Q_t = Q_{target}(s', a'; \theta^-)$
18.         $\mathcal{L} = (Q_p - (r + \gamma \max_{a'} Q_t))^2$
19.         update $\theta^+$ with gradient descent on $\mathcal{L}$
20.         if steps % update frequency == 0
21.            then copy the weights: $\theta^+ \rightarrow \theta^-$
22.         end if
23.     end for
24. end for

1. Initialize Experience Replay (ER)
2. Initialize $\theta^+$ and $\theta^-$
3. set update frequency
4. Initialize $B \in \mathbb{R}^{M \times 2}$ with $[B]_{ij} \sim \mathcal{N}(0, \sigma^2)$
5. for all episodes do
6.    for all relays do
7.       Feature Mapping:
8.          $\mathbf{v} = \mathbf{v}(\mathbf{s}) = [sin(2\pi B\mathbf{s}), cos(2\pi B\mathbf{s})]^T$
9.       input $\mathbf{v}$ to $Q_{policy}$
10.      get $Q_{policy}(\mathbf{v}, a; \theta^+) \forall a$
11.      subtract $\mu = 1\%$ from $Q_{policy}(\mathbf{v}, a; \theta^+) \forall a \neq stay$
12.      $\epsilon$-greedy choice of a, respecting grid boundaries and priority
13.      observe next state $\mathbf{s}'$ and reward r
14.      store $\{\mathbf{s}, a, \mathbf{s}', r\}$ to ER
15.      $\mathbf{s} = \mathbf{s}'$
16.    end for
17.    sample a batch of tuples $\{\mathbf{s}, a, \mathbf{s}', r\}$ from ER
18.    for all tuples in the batch do
19.      Feature Mapping:
20.         $\mathbf{v} = \mathbf{v}(\mathbf{s}) = [sin(2\pi B\mathbf{s}), cos(2\pi B\mathbf{s})]^T$
21.      input $\mathbf{v}$ to $Q_{policy}$, get $Q_p = Q_{policy}(\mathbf{v}, a; \theta^+)$
22.      Feature Mapping:
23.         $\mathbf{v}' = \mathbf{v}(\mathbf{s}') = [sin(2\pi B\mathbf{s}'), cos(2\pi B\mathbf{s}')]^T$
24.      input $\mathbf{v}'$ to $Q_{target}$, get $Q_t = Q_{target}(\mathbf{v}', a'; \theta^-)$
25.      $\mathcal{L} = (Q_p - (r + \gamma max_{a'} Q_t))^2$
26.      update $\theta^+$ with gradient descent on $\mathcal{L}$
27.      if steps% update frequency == 0
28.         then copy the weights: $\theta^+ \rightarrow \theta^-$
29.      end if
30.    end for
31. end for

REINFORCEMENT LEARNING FOR MOTION POLICIES IN MOBILE RELAYING NETWORKS

CROSS-REFERENCE TO RELATED APPLICATION

This application claims priority to U.S. Provisional Patent Application No. 63/233,306 filed on Aug. 15, 2021 entitled REINFORCEMENT LEARNING FOR MOTION POLICIES IN MOBILE RELAYING NETWORKS, which application is incorporated herein by reference in its entirety.

STATEMENT OF RIGHTS TO INVENTIONS MADE UNDER FEDERALLY SPONSORED RESEARCH

This invention was made with government support under Grant No. W911NF2110071 awarded by the US Army Research Office. The government has certain rights in the invention.

FIELD OF THE DISCLOSURE

The present disclosure generally relates to relay beamforming networks and, in particular, to joint beamforming and relay motion control in mobile relay beamforming networks.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In distributed relay beamforming networks, spatially distributed relays, cooperatively support the communication between a source and its destination. Such networks are important in disaster relief operations, search-and-rescue missions, or aerial mapping, where fixed infrastructure is not available. Mobile relays, such as a swarm of Unmanned Aerial Vehicles (UAVs), can improve the network's performance by optimally determining their positions so that when they transmit they experience the best channel conditions for communication.

The value of a relay for beamforming is directly linked to the relay's channel to the source and the destination. For static relays, relay selection has received a lot of attention in the literature. For mobile relays, optimally positioning of the relays is a relay motion control problem. Determining the optimal positions of the mobile relays requires knowledge of the Channel State Information (CSI) on all candidate positions at a future time instance, which is, of course, impossible to obtain when the channel varies in time and space. However, due to the fact that both the source-relay and relay-destination channel magnitudes are spatiotemporally correlated, the future optimal relay positions can be estimated in a predictive fashion. Magnitude CSI correlations are imparted by the shadowing propagation effect, which is more pronounced in urban environments.

Determining the optimal relay positions of a cooperative mobile relay beamforming network has been previously examined. In that work, a time-slotted approach is considered, where in each slot, the relays implement optimal beamforming, estimate in a predictive fashion their optimal positions for the next slot, and move to those positions so that they are optimally positioned to beamform. The relay positions and beamforming weights are obtained so that the expected cumulative SINR at the destination is maximized, subject to a total transmission power constraint at the relays. Each relay can estimate its next slot position independent of the other relays, using its collected experience up to the current moment. However, this assumes the system has full knowledge of the CSI statistics, which, in a dynamic environment, requires substantial overhead to obtain.

SUMMARY

Various deficiencies in the prior art are addressed by systems, methods, architectures, mechanisms or apparatus for determining a subsequent time slot position for each of a plurality of spatially distributed relays configured for time slot based beamforming supporting a communication channel between a source and a destination, comprising: for each of a plurality of update steps, using a neural network receiving relay coordinates s as input for estimating a state-action value function $Q(s, a; \theta)$ for each relay wherein a displacement action a for each relay is selected with respect to a communication channel objective maximization step over the estimates of the neural network, the application of the selected displacement action a for each relay generating a {state, action, nextstate, reward} tuple for storage in an experience replay (ER) memory buffer, wherein uniform sampling of tuples stored in the ER memory buffer is used to update neural network weights for subsequent selection of displacement action a for each relay to improve neural network decision quality; wherein, for each of the plurality of update steps, a second neural network $Q(s', a'; \theta_t)$ is used to provide an estimated value associated with the communication channel objective being maximized by processing a portion of the stored {state, action, nextstate, reward} tuples.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 3 depicts a flow diagram of a method according to various Plain deep Q with energy preservation embodiments;

FIG. 4 depicts a flow diagram of a method according to various Deep Q Learning with Fourier Feature Mapping of the state embodiments;

Figure 1:
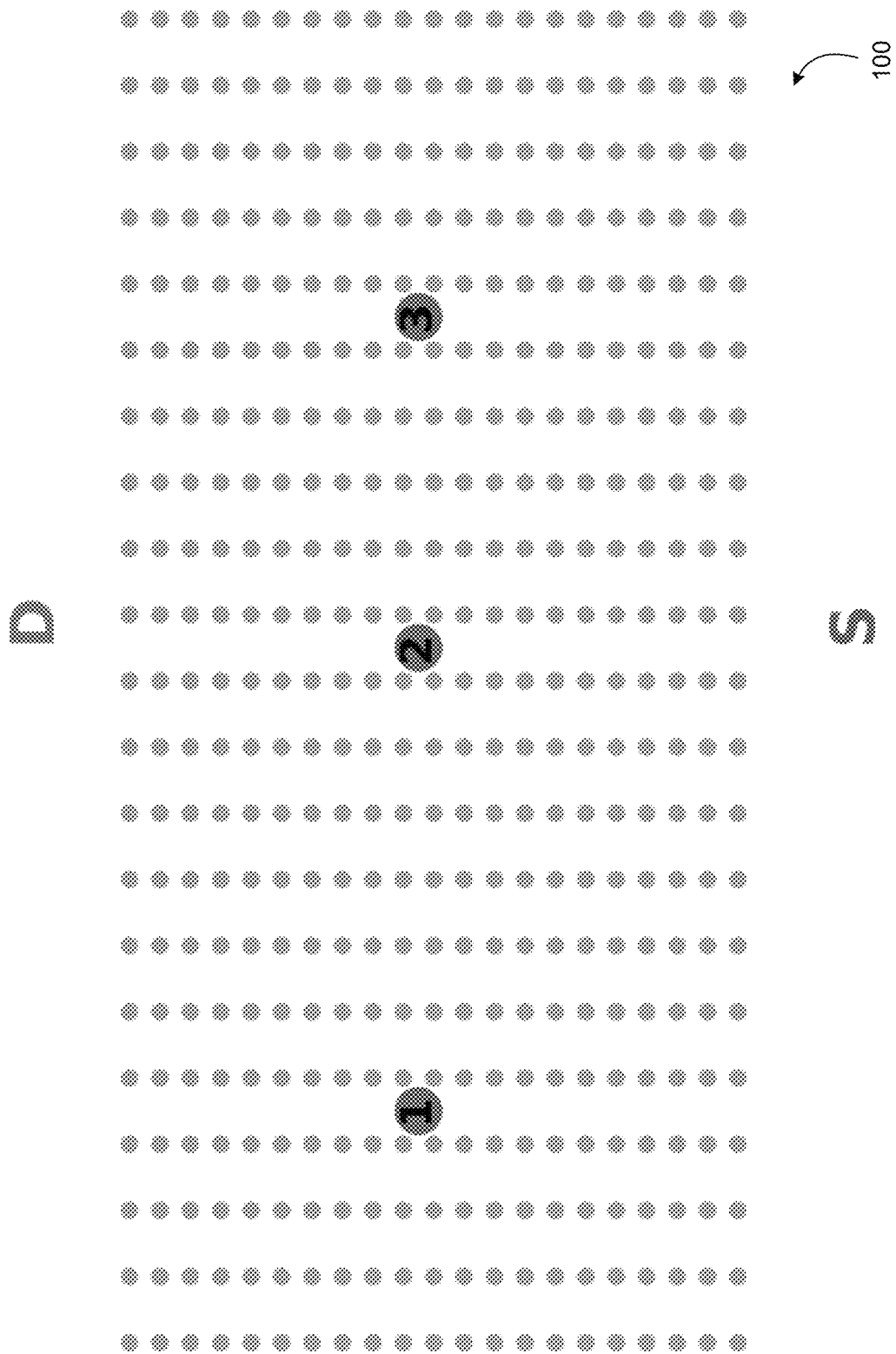
FIG. 1 graphically depicts a 20×20 meter grid with 3 relays facilitating communication between a source-destination pair.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various deficiencies in the prior art are addressed by systems, methods, and apparatus enabling a communications channel between a source device and a destination device by moving relay devices (or agents thereof) into appropriate positions at appropriate times/timeslots as determined using reinforcement learning so as to maintain a minimum or at least sufficient signal-to-noise ratio (SNR) or signal-to-interference+noise ratio (SINR) for the communications channel.

In various embodiments, the relays are fixed relay devices, such as mounted on buildings or other objects, or moveable relay devices such as mounted on ground or air vehicles, or self-propelled ground or air drones, and so on. The relays move in accordance with motion policies determined via reinforcement learning that describe the type of movement allowed and the appropriate movement to be made. Various embodiments predict/select a trajectory of the agents/drones over time to accommodate the communication. The relays may have position, speed, direction, glidepath, performance envelope and other criteria associated with them.

Various embodiments are useful to control relays/drones/agents to accommodate a communication by navigating in a dynamic environment having electronic and physical obstacles. Some relays/drones/agents may move via preprogrammed paths or randomly, some may be fully controlled.

The embodiments apply a reinforcement learning approach to estimate how communication channel changes (propagation medium, etc.) based on current and subsequent (possible) relay positions to provide the "best" (at least sufficient) possible Signal-to-Noise Ratio (SNR) and/or Signal-to-Interference+Noise Ratio (SINR) for the communication channel.

Various embodiments are discussed within the context of joint beamforming and relay motion control in mobile relay beamforming networks, operating in a spatiotemporally varying channel environment. A time slotted approach is adopted, where in each slot, the relays implement optimal beamforming, and estimate their optimal positions for the next slot. The embodiments place the problem of relay motion control in a sequential decision-making framework. The embodiments employ Reinforcement Learning (RL) to guide the relay motion, with the goal of maximizing the cumulative Signal-to-Interference+Noise Ratio (SINR) at the destination.

First, the embodiments present a model based RL approach that based on partial knowledge of the channel model along with channel measurements at the current relay positions predicts the channel magnitude in time and space, and determines the motion based on the obtained channel predictions.

Second, various embodiments propose deep Q learning for the relay motion control, which is a model-free approach and does not rely on channel models. For the deep Q learning approach, various embodiments propose two modified Multilayer Perceptron Neural Networks (MLPs or MLP NNs) for approximating the value function Q. The first modification applies a Fourier feature mapping of the state before passing it through the MLP. The second modification constitutes a different neural network architecture that uses sinusoids as activations between layers. Both modifications enable the MLP to better learn the high frequency value function, and have a profound effect on convergence speed and SINR performance. Finally, various embodiments are supported by conducting a comparative analysis of all the presented approaches and provide insights on the advantages and drawbacks of each one.

The various embodiments contemplate a relay control problem posited in a Reinforcement Learning (RL) framework. Specifically, the various embodiments provide two RL approaches, a first or model-based RL method uses partial Channel State Information (CSI) statistics information (i.e., knowledge of the structure of a channel but not the channel parameters), and a second model-free RL method. The examples discussed herein assume that each relay can move within a certain gridded region, one grid cell at a time, to one of its neighboring grid cells, or stay in the same position.

The model-based RL method assumes a Multi-Armed Bandits (MAB) type of approach, where each relay chooses one of its neighboring grid cells so that it maximizes its reward, which is the relay's contribution to the cumulative SINR at the destination. The embodiments assume a known structure for the CSI spatiotemporal correlations except that some of the model parameters are unknown, and propose a relay motion policy that estimates the unknown parameters and predictively estimates the channel magnitude in time and space. This work and the various embodiments described herein exhibit corrections to and improvements upon an updating rule for estimating the AR model of the interference and, as a result, the performance of the method has improved.

The model-free RL method employs deep Q learning for the relay motion control. The relay movement is guided via a neural network, which learns the Q function by updating its weights from experience, using stochastic gradient descent. As in many applications using deep RL, MLPs can be employed to approximate the Q function. However, recent results have demonstrated an inability of MLPs to learn high frequency functions in low dimensional problem domains, a phenomenon called "spectral bias". In an illustrative embodiment, the state corresponds to the coordinates of the respective relay's position on the space grid, the action space is the set of relay displacements to one of the neighboring grid cells, or staying at the current cell, and the reward is the respective relay's contribution to the collective SINR achieved at the destination. When employing an MLP to approximate the Q function, the MLP takes as input low-dimensional coordinates (points in the 2-D space), and learns a Q function that is highly varying due to the variability of the channel magnitude with respect to time and space. Therefore, the performance of MLP would suffer from spectral bias. To tackle the problem, the various embodiments provide several modifications of the deep Q learning scheme. The first modification amounts to applying a Fourier feature mapping on the state before passing it through the MLP. This mapping is performed with the use of a zero-mean Gaussian matrix, with the variance of the matrix elements controlling the range of frequencies that the MLP can learn. The second modification pertains to the implementation of a different neural network architecture, which is also feed forward with dense layers but the activation function between layers is a sinusoid. The success of the architectural scheme involves a particular methodology for initializing the weights.

Prior Reinforcement Learning has employed tabular Q learning, with a focus on relay selection rather than relay motion control. Deep Q learning approaches have been examined for resource allocation, where, again, motion control does not come into play. Relay movement has been examined, but both approaches use a table to approximate and update the Q function. In contrast to these approaches, the Q learning methods proposed herein employ Q function approximation using deep neural networks. In general, tabular approaches do not scale well for large state spaces and generalization is impeded, because no information can be inferred about the value of Q at a particular state-action pair, unless the pair is experienced. This is not the case for function approximation because the Q function is parameterized with a set of weights, so updating the weights for a particular state-action pair provides intelligence for the value of Q for all other pairs. In a different scenario, deep Q learning is used to control the motion of a single unmanned autonomous vehicle that acts as a base station for multiple static end users. The goal is to maximize the sum rate.

The below description of the various embodiments provides a number of novel contributions to the relevant arts, such as: (1) a novel, MAB-type RL approach proposed for relay motion control that exploits the known structure of the channel model, but estimates key model parameters during the learning process, and (2) a novel, model free deep Q learning motion control approach is proposed, where an MLP is used to approximate the Q function, and an $\in$-greedy policy with respect to the Q estimates for every state-action pair is used.

It is noted that the Q function depends on low-dimensional coordinates and varies highly due to the random channel variations with time and space. To mediate the effect of the spectral bias on the quality of the Q function approximation it is proposed that (i) the application of a Fourier mapping on the state before passing it through the MLP, and (ii) a different neural network architecture that uses sinusoids as activations between layers. The embodiments demonstrate via simulations that the proposed mappings have a profound effect in speed of convergence and performance.

It is further noted that comparisons of the model based approach and the deep Q learning methods based on simulations show significant increases in performance of the latter.

The information related to the various embodiments will be presented via the following sections: a section introducing the relaying setup and describes the spatiotemporal correlation structure of the assumed channel model; a section that formulates the joint relay communication and movement problem according to the 2-stage framework; a section that presents novel relay motion control methods; a section that contains simulations accompanied by the relevant discussion and comparison; and a concluding section.

Relaying Set Up/Spatiotemporal Correlation Structure of the Assumed Channel Model System Model. Let us initially consider source S, located at position $p_S \in \mathbb{R}^2$, intending to communicate with user D, located at $p_D \in \mathbb{R}^2$. It is assumes that line-of-sight (LoS) wireless communication between the source and the destination is not feasible, so R single-antenna mobile relays are used to support the communication. Let us assume that the relays are deployed over a 2-dimensional space, which is partitioned into M×M imaginary grid cells (see FIG. 1). Let us divide the time horizon into T time slots of equal duration, and let t denote the current time slot. At every time slot, a grid cell can be occupied by, at most, one relay. In particular, FIG. 1 graphically depicts a 20×20 meter grid 100 with 3 relays (1, 2, and 3) facilitating communication between a source-destination pair (S, D).

Source S transmits the symbol $s(t) \in \mathbb{C}$, with $\mathbb{E}[|s(t)|^2]=1$, using power $\sqrt{P}>0$. The signal received at relay $R_r$, located at $p_r(t)$, $r=1, \ldots, R$, is, after dropping for brevity the dependence of the relay position on t, $$x_r(t) = \sqrt{P} f_r(p_r,t) s(t) + n_r(t), \quad \text{(eq. 1)}$$

where $f_r$ denotes the channel from S to relay $R_r$, and $n_r(t)$ is the reception noise at relay $R_r$, with $\mathbb{E}[|n_r(t)|^2]=\sigma^2$, $r=1, \ldots, R$.

Each of the relays is equipped with a single antenna and operates in an Amplify-and-Forward (AF) fashion, i.e., it multiplies the received signal, $x_r(t)$, by weight $w_r(t) \in \mathbb{C}$. All R relays transmit the weighted signal simultaneously. The combined signal received at D is $$y(t) = \sum_{r=1}^{R} (p_D,t) w_r(t) x_r(t) + n_D(t), \quad \text{(eq. 2)}$$

where $g_r$ denotes the channel from relay $R_r$ to destination D, and $n_D(t)$ is the reception noise at D, with $\mathbb{E}[|n_D(t)|^2]=\sigma_D^2 \cdot y(t)$ can be equivalently expressed as $$y(t) = \underbrace{\sum_{r=1}^{R} g_r(p_D, t)w_r(t)\sqrt{P} f_r(p_r, t)s(t)}_{\text{desired signal}} + \quad (\text{eq. 3})$$

$$\underbrace{\sum_{r=1}^{R} g_r(p_D, t)w_r(t)n_r(t) + n_D(t)}_{\text{noise}} \triangleq y_{signal}(t) + y_{noise}(t),$$

where $y_{signal}(t)$ is the desired signal components and $n_D(t)$ the noise at the destination.

Channel Model

The statistical description of the channel between the source and the r-th relay, located at position $p \in \mathbb{R}^2$ during time slot t, can be modeled as a product of four terms, as shown by the following:

$$f_r(p,t) \triangleq f_r^{PL}(p)f_r^{SH}(p,t)f_r^{MF}(p,t)e^{j2\pi\phi(t)}, \quad (\text{eq. 4})$$

where $f_r^{PL}(p) \triangleq \|p-p_s\|_2^{-\ell/2}$ is the path-loss component, with $\ell$ being the path-loss exponent; $f_r^{SH}(p, t)$ the shadow fading component; $f_r^{MF}(p,t)$ the multi-path fading component; and $e^{j2\pi\phi(t)}$ is the phase term, with $\phi$ uniformly distributed in [0,1]. A similar decomposition holds for the relay-destination channel $g_r(p,t)$.

On taking the logarithm of the squared channel magnitude of (eq. 4), the embodiments obtain the additive model $$F_r(p,t) \triangleq 10 \log_{10}(|f_r(p,t)|^2) \triangleq \alpha_r^f(p)+\beta_r^f(p,t)+\xi_r^f(p,t), \quad (\text{eq. 5})$$

with $$\alpha_r^f(p) \triangleq -\ell \, 10 \log_{10}([0]p-p_{s_2}), \quad (\text{eq. 6})$$

$$\beta_r^f(p,t) \triangleq 10 \log_{10}(|f_r^{SH}(p,t)|^2) \sim \mathcal{N}(0,\eta^2), \text{ and} \quad (\text{eq. 7})$$

$$\xi_r^f(p,t) \triangleq 10 \log_{10}(|f_r^{MF}(p,t)|^2) \sim \mathcal{N}(\rho,\sigma_\xi^2). \quad (\text{eq. 8})$$

In the above, $\eta^2$ is the shadowing power, and $\rho, \sigma_\xi^2$ are respectively the mean and variance of multipath fading component.

Although the multipath fading component, $\xi_r^f(p, t)$, is i.i.d. between different positions and times, the shadowing component, $\beta_r^f(p, t)$, is correlated. Specifically, the shadowing component $\beta_r^f(p_i, t)$ (similarly $\beta_r^g(p_i, t)$), between any two positions $p_i$ and $p_j$, at two time slots $t_a$ and $t_b$, exhibits correlations according to the following:

$$\mathbb{E}[\beta_r^f(p_i, t_a)\beta_r^f(p_j, t_b)] = \tilde{\Sigma}^f(p_i, p_j)e^{-\frac{|t_a-t_b|}{c_2}}, \quad (\text{eq. 9})$$

where $$\tilde{\Sigma}^f(p_i,p_j) \triangleq \eta^2 e^{-\|p_i-p_j\|_2/c_1} \in \mathbb{R}^{M^2 \times M^2}, \quad (\text{eq. 10})$$

with $c_1$ denoting the correlation distance, and $c_2$ the correlation time.

Additionally, the embodiments consider $$\mathbb{E}[\beta_r^f(p_i, t_a)\beta_r^g(p_j, t_b)] = \tilde{\Sigma}^{fg}(p_i, p_j)e^{-\frac{|t_a-t_b|}{c_2}}, \quad (\text{eq. 11})$$

where $$\tilde{\Sigma}^{fg}(p_i, p_j) = \tilde{\Sigma}^{f}(p_i, p_j)e^{-\frac{\|p_S-p_D\|_2}{c_3}} \quad (\text{eq. 12})$$

and $c_3$ denoting the correlation distance of the source-destination channel.

2-Stage Problem Formulation—Joint Relay Communication and Movement Problem According to the 2-Stage Framework In order to jointly schedule the relay communication and movement on a per time slot basis, the embodiments adapt the 2-stage problem formulation. In the following, the embodiments design the beamforming weights and develop the relay motion control strategies.

At every time slot the relays must determine the optimal beamforming weights $w(t) \in \mathbb{C}^{R \times 1}$ that maximize the SINR at the destination, subject to a transmission power constraint on the relays. This can be formulated as follows:

$$\begin{aligned}\underset{w(t)}{\text{maximize}} \quad & \frac{\mathbb{E}[|y_{signal}(t)|^2]}{\mathbb{E}[|y_{noise}(t)|^2]}, \\ \text{subject to} \quad & \sum_{r=1}^{R} \mathbb{E}[|x_r(t)|^2] \leq P_R \end{aligned} \quad (\text{eq. 13})$$

where $P_R$ is the transmission power budget of all relays. The optimal value of (13) has a closed form expression of:

$$V(t) = \sum_{r=1}^{R} \frac{P_R P_S |f_r(p_r, t)|^2 |g_r(p_r, t)|^2}{P_S \sigma_D^2 |f_r(p_r, t)|^2 + P_R \sigma^2 |g_r(p_r, t)|^2 + \sigma^2 \sigma_D^2} \quad (\text{eq. 14})$$

$$= \sum_{r=1}^{R} V_I(p_r, t).$$

Notice that (eq. 14) is a distributed expression, where each one of the terms in the summation is a function only of the channel magnitudes that pertain to each individual relay. Therefore, maximizing the destination's SINR at a time slot t, is equivalent to every relay maximizing its own local $V_I(p_r, t)$.

Relay Motion Control Methods and Policies

In parallel to the beamforming at time slot t, the relays must also strategically select their immediate position for the subsequent time slot t+1. Determining the exact relay positions for the subsequent time slot is impossible in the absence of future CSI knowledge. Instead, the relays must use their collected experience thus far to make their decision.

Assuming a relay can move at most $\delta=1$ grid cell per time slot, then its set of possible movements consists of moving either west (W), north (N), south (S), east (E), a combination of the four cardinal directions, or not moving at all (stay) from its current position, i.e. $\mathcal{A}_{full}=\{W, NW, N, NE, \text{stay}, E, S, SE, SW\}$. The relay motion (e.g., as defined via a relay motion model (RMM)) is governed in accordance with some basic assumptions, such that the actual set of feasible movements for a relay at every time slot t is $\mathcal{A}_r(t) \subseteq \mathcal{A}_{full}$, r=1, ..., R.

In general, some relay movements may not be allowed for two reasons: first, the relays are aware of their surroundings and therefore are permitted to move within the assumed grid boundaries and second, at every time instance at most one relay can occupy a grid cell, i.e. relay collisions are avoided through a collision avoidance mechanism. Finally, various embodiments may include a hierarchical priority or positional priority to address the situation where more than one relay may attempt to move to the same spot. In the scenario considered here, the optimal SINR solution is decoupled across the relays, allowing the motion control decision to be performed independently at each relay. In the following, various embodiments are described in detail within the context of proposed model-based and model-free motion control policies.

Model Based Relay Motion

In a model-based relay motion embodiment, the relays may be treated as agents which take an action (e.g., move to a grid position) and receive a reward (e.g., a communications channel parameter such as Signal-to-Noise Ratio (SNR), Signal-to-Interference+Noise Ratio (SINR), and/or or some other parameter) having a value which is a function of a potential landing position. This stateless formulation in various embodiments treats each potential relay position (e.g., each grid position) as a different bandit whose reward is independent of the previous positions of the relay; namely, (a) only adjacent grid positions are available to each agent who must also take into consideration collision avoidance schemes, (b) rewards of different bandits (i.e., grid positions or positions defined in another manner) are correlated based on their distance, and (c) the agents communicate with a central station which gathers all channel state information (CSI) and then returns channel model information back to the agents so they can choose their next respective positions.

It is assumed that, at every time slot t, the relays know their position on the grid as well as the position of the source and the destination. Moreover, they observe the log-magnitudes $F_r(t)$ and $G_r(t)$. All R relays send their observed CSI to a central fusion center, which gathers this information. From Eqs. (5)-(8) it is seen that:

$$F_r(t) = -10 \log_{10}([0]p_r(t) - p_{s_2}) \ell + \rho + \epsilon_r^f(t) \quad \text{(eq. 15)}$$

$$G_r(t) = -10 \log_{10}([0]p_r(t) - P_{D_2}) \ell + \rho + \epsilon_r^g(t) \quad \text{(eq. 16)}$$

where $$\epsilon_r^f(t) = \beta_r^f(p,t) + \xi_r^f(p,t) - \rho \quad \text{(eq. 17)}$$

$$\epsilon_r^g(t) = \beta_r^g(p,t) + \xi(p,t) - \rho \quad \text{(eq. 18)}$$

are zero-mean stochastic processes.

It is noted that, although the channel model structure of (eq. 5) is used, it is assumed that all parameters, i.e., $\eta^2$, $\sigma_\xi^2$, $\ell$, $\rho$, $c_1$, $c_2$, $c_3$ are unknown. In the following, $\ell$ and $\rho$ will be estimated and used to predict the next-slot channel at any point in space.

The problem can be formulated compactly as $$\begin{bmatrix} F(t) \\ G(t) \end{bmatrix} = \begin{bmatrix} D_F(t) & 1 \\ D_G(t) & 1 \end{bmatrix} \begin{bmatrix} \ell \\ \rho \end{bmatrix} + \overline{\epsilon}(t) \in \mathbb{R}^{2R \times 1}, \quad \text{(eq. 19)}$$

where dropping the dependence of $F_r$ on $(p, t)$ for brevity, $$F(t) \triangleq [F_1, \ldots, F_R]^T \in \mathbb{R}^{R \times 1}, \quad \text{(eq. 20)}$$

$$D_F(t) \triangleq [\{-10 \log_{10}([0]p_r(t) - p_{s_2})\}_{r=1}^R], \quad \text{(eq. 21)}$$

$$\overline{\epsilon}(t) = [\epsilon_1^f(t), \ldots, \epsilon_R^f(t), \epsilon_1^g(t), \ldots, \epsilon_R^g(t)]. \quad \text{(eq. 22)}$$

G(t) and $D_G$ are similarly defined. For simplicity rewrite (eq. 19) as follows:

$$\overline{F}(t) = \overline{D}(t) \begin{bmatrix} \ell \\ \rho \end{bmatrix} + \overline{\epsilon}(t) \quad \text{(eq. 23)}$$

where $\overline{F}(t) = [F(t), G(t)]^T$ and $\overline{D}(t) = \begin{bmatrix} D_F(t) & 1 \\ D_G(t) & 1 \end{bmatrix}$.

Due to its dependence on shadowing, $\overline{\epsilon}(t)$ is spatiotemporally correlated. Let us model it along the time axis as an autoregressive (AR) process of order 1, i.e., $$\overline{\epsilon}(t) = \kappa \overline{\epsilon}(t-1) + v(t) \quad \text{(eq. 24)}$$

where v is white noise. Since the channel parameters are unknown, the covariance matrix of (t) is unknown.

Based on (eq. 19) one can find the $\ell$ and $\rho$ via the method of generalized least squares (GLS), which an iterative process. Since in each slot there is provided have access to only one sample of the F(t), G(t), some embodiments use a proposed modification of GLS, in which the iteration proceeds across time slots. In each slot, the proposed approach estimates the AR coefficient based on estimates of the covariance of $\overline{\epsilon}(t)$, applies a whitening filter on all terms of (eq. 19), and obtains the resulting least-squares solution of the whitened problem, that is:

1. Compute $$\hat{\epsilon}(t) = \overline{F}(t) - \overline{D}(t) \begin{bmatrix} \hat{\ell}_t \\ \hat{\rho}_t \end{bmatrix}. \quad \text{(eq. 25)}$$

2. Estimate the empirical covariance matrices $$\hat{\sum}_0(t) = \mathbb{E}[\hat{\epsilon}(t)\hat{\epsilon}^T(t)] = \frac{1}{t} \sum_{k=1}^{t} \hat{\epsilon}(k)\hat{\epsilon}^T(k)$$

$$= \frac{1}{t}\left(\sum_{k=1}^{t-1} \hat{\epsilon}(k)\hat{\epsilon}^T(k) + \hat{\epsilon}(t)\hat{\epsilon}^T(t)\right)$$

$$= \frac{t-1}{t}\hat{\sum}_0(t-1) + \frac{1}{t}\hat{\epsilon}(t)\hat{\epsilon}^T(t),$$

and $$\hat{\sum}_1(t) = \mathbb{E}[\hat{\epsilon}(t)\hat{\epsilon}^T(t-1)] = \frac{1}{t} \sum_{k=1}^{t} \hat{\epsilon}(k)\hat{\epsilon}^T(k-1)$$

$$= \frac{t-1}{t}\hat{\sum}_1(t-1) + \frac{1}{t}\hat{\epsilon}(t)\hat{\epsilon}^T(t-1).$$

3. Estimate the AR coefficient. Note that $\Sigma_1(t) = \kappa \Sigma_0(t)$ and since K is scalar it is then provided that $\text{vec}(\Sigma_1(t)) = \kappa \cdot \text{vec}(\Sigma_0(t))$. Then the estimate is, $$\hat{\kappa} = \frac{\text{vec}\left(\hat{\sum}_0(t)\right)^T \text{vec}\left(\hat{\sum}_1(t)\right)}{\text{vec}\left(\hat{\sum}_0(t)\right)^T \text{vec}\left(\hat{\sum}_0(t)\right)} \quad \text{(eq. 26)}$$

$$= \text{vec}\left(\hat{\sum}_0(t)\right)^+ \text{vec}\left(\hat{\sum}_1(t)\right), \quad \text{(eq. 27)}$$

where vec(•) denotes the vectorization of the corresponding matrix, $(\cdot)^+$ denotes the pseudo-inverse, and $\hat{\kappa} < 1$.

4. Apply the whitening filter $\hat{H}(z)=1-\hat{\kappa}z^{-1}$ on $\overline{F}(t)$ and $\overline{D}(t)$ to obtain $$F_w(t)=\overline{F}(t)-\hat{\kappa}\overline{F}(t-1) \text{ and}$$

$$D_w(t)=\overline{D}(t)-\hat{\kappa}\overline{D}(t-1).$$

5. The GLS estimate is $$\begin{bmatrix}\hat{\ell}_t\\\hat{\rho}_t\end{bmatrix}=\overline{D}_w^+(t)F_w(t). \quad \text{(eq. 28)}$$

At time t=1, the ML estimate is taken as $$\begin{bmatrix}\hat{\ell}_1\\\hat{\rho}_1\end{bmatrix}=\overline{D}^+(1)\overline{F}(1), \quad \text{(eq. 29)}$$

and $\hat{\epsilon}(0)$ is a vector of all zeros.

The above iterative scheme eventually converges to $\ell$, $\rho$. The GLS procedure is known to be stable and to converge under mild conditions.

Formulation (eq. 26) corrects a mistake in prior formulae for estimating the AR parameter, thus obtaining improved results such as presented below.

The most dominant operation of the above iterative procedure is finding the pseudo-inverse of $D_w(t)$ in step 5, which requires $\mathcal{O}(R^2)$ operations at every time slot.

Once the channel parameters have been estimated, the predicted log-magnitudes of all candidate future relay positions are obtained by taking the expectation of (eq. 19) and since $D_F(t+1)$, $D_G(t+1)$, $\hat{\ell}_t$, $\hat{\rho}_t$ are deterministic and $\overline{\epsilon}(t+1)$ is zero-mean, to provide:

$$\begin{bmatrix}\hat{F}(t+1)\\\hat{G}(t+1)\end{bmatrix}=\begin{bmatrix}D_F(t+1) & 1\\D_G(t+1) & 1\end{bmatrix}\begin{bmatrix}\hat{\ell}_t\\\hat{\rho}_t\end{bmatrix}. \quad \text{(eq. 30)}$$

Then $$|\hat{f}_r(p,t+1)|=10^{F_r(p,t+1)/20}, \quad \text{(eq. 31)}$$

and similarly obtained $|\hat{g}_r(p, t+1)|$.

The predicted magnitudes are used in the respective SINR expressions of (eq. 14) to evaluate the quality of future candidate relay positions. Each relay decides to move to the position that yields the maximum corresponding $V_I$.

Deep Q Learning for Relay Motion Control

Various embodiments use deep Q learning for relay motion control, which is a model-free approach and does not rely on channel models. For the deep Q learning approach, some embodiments use two modified Multilayer Perceptron Neural Networks (MLPs) for approximating the value function Q. The first modification applies a Fourier feature mapping of the state before passing it through the MLP. The second modification constitutes a different neural network architecture that uses sinusoids as activations between layers. Both modifications enable the MLP to better learn the high frequency value function, and have a profound effect on convergence speed and SINR performance. Finally, conducting a comparative analysis of all the presented approaches and provide insights on the advantages and drawbacks of each one.

That is, for relay motion control using Q learning, some embodiments do not need explicit information for the underlying channel correlation structure. These embodiments employ function approximation using MLPs.

Based on (eq. 14), it can be inferred that each relay can learn its own individual motion policy independent of the other relays. The embodiments employ a first MLP that learns the state-action value function $Q(s, a; \theta)$ and is shared by all the relays. The motion policy is $\epsilon$-greedy with respect to the estimated value function. Some embodiments adopt a deep Q learning method wherein the state $p\equiv s\equiv[x, y]^T$ is comprised of a vector of the coordinates of the grid cell, where the relay is located. The reward r is the respective $V_1$ given by (eq. 14). At each time slot the relay selects an action $a \in \mathcal{A}_{full}$.

The training of neural networks for Q function approximation uses two mechanisms to assist with stability and convergence.

The first stability and convergence mechanism is an Experience Replay. Specifically, each tuple of experience for a relay, namely {state, action, nextstate, reward}≡{s, a, s', r}, is stored in a memory buffer called Experience Replay. At each step of the neural network weight update, the method samples uniformly a batch of experiences from the Experience Replay and use that batch to perform minibatch gradient descent using the loss function:

$$\mathcal{L}=\left(Q(s,a;\theta)-\left(r+\gamma\max_{a'}Q(s',a';\theta)\right)\right)^2. \quad \text{(eq. 32)}$$

This process is part of the pipeline to ensure that the inputs to the neural network, during training, are not as correlated as they would be if the process were to perform updates on consecutive experiences from a given relay motion trajectory. Therefore, at each update step the neural network weights are updated according to:

$$\theta_{t+1}=\theta_t+\lambda(Y_t-Q(s,a;\theta_t))\nabla_{\theta_t}Q(s,a;\theta_t). \quad \text{(eq. 33)}$$

where, $$Y_t=r+\gamma\max_{a'}Q(s',a';\theta_t) \quad \text{(eq. 34)}$$

The parameter $\lambda$ is a small scalar step size, denoted as the learning rate. The parameter $\gamma$ is denoted as the discount factor and quantifies the amount of importance that the algorithm assigns to delayed rewards. The parameters a, a' $\in \mathcal{A}_{full}$ correspond to the action taken during the current slot and the action taken on the subsequent slot, respectively. Also, s and s' correspond to the states on the current and subsequent time slot respectively.

The second stability and convergence mechanism is a Target Network. The Target Network ($Q_{target}(s',a'; \theta^-)$) is a neural network that provides the $Q(s', a'; \theta_t)$ estimate at every update step in (34). This network has the same architecture as the Policy Network ($Q_{policy}(s',a'; \theta^+)$), i.e., the network used for estimating the Q function (provides the $Q(s, a; \theta_t)$ in (33)). The Target Network's weights may be kept frozen throughout the update process so as to not perform gradient descent on these weights, though occasionally the weights of the Policy Network may be copied to the Target Network. This provides stationary targets for the weight updates and brings the task of the Q function approximation closer to a supervised set up.

The displacement of the relays at each time slot (choosing any action other than stay) results in additional energy consumption. To promote energy preservation, some embodiments do not perform the ∈-greedy policy directly on the estimates $Q_{policy}(s, a; \theta^+)$ of the Q function (output of the Policy Network at every time slot), but rather subtract a small percentage, μ, from the estimates for all actions a, except for the action stay. In that fashion, discouraging relay displacement if the value of the Q function, for the action that requires moving, is not much higher than the value of Q for staying. This is a mechanism that promotes energy preservation. The choice of μ quantifies a trade off between energy preservation and cumulative SINR at the destination. For these simulations, in the subsequent sections, the choice was made for μ to be 1%, after experimenting with values in the range of 0.1% to 10%.

FIG. 3 depicts a flow diagram of a method according to various Plain deep Q with energy preservation embodiments. Specifically, the control flow of the Plain deep Q with energy preservation embodiments are depicted in FIG. 3 and shown in Algorithm 1, as follows:

```
1.   Initialize Experience Replay (ER)
2.   Initialize θ⁻ and θ⁺
3.   set update frequency
4.   for all episodes all do
5.     for all relays do
6.       input s to Q_policy
7.       get Q_policy(s, a; θ⁺) ∀a
8.       subtract μ = 1% from Q_policy(s, a; θ⁺) ∀a ≠ stay
9.       ∈-greedy choice of a, respecting grid boundaries and priority
10.      observe next state s' and reward r
11.      store {s,a,s',r} to ER
12.      s = s'
13.    end for
14.    sample a batch of tuples {s,a,s',r} from ER
15.    for all tuples in the batch do
16.      input s to Q_policy, get Q_p = Q_policy(s, a; θ⁺)
17.      input s' to Q_target, get Q_t = Q_target(s', a'; θ⁻)
18.      𝓛 = (Q_p − (r + γmax_a'Q_t))²
19.      update θ⁺ with gradient descent on 𝓛
20.      if steps % update frequency == 0
21.        then copy the weights: θ⁺ → θ⁻
22.      end if
23.    end for
24.  end for
```

Generally speaking, the method 300 of FIG. 3 and Algorithm 1 provides: (1) a first MLP NN denoted as that is used to learn a state-action value function Q(s, a; θ) that is shared by all of the relays and enables each of the relays to learn its own individual motion policy independent of the other relays; (2) a second MLP NN At step 1, the Experience Replay (ER) memory buffer is initialized. As discussed above, each tuple of experience for a relay, namely {state, action, nextstate, reward}≡{s, a, s',r}, will be stored in the ER memory buffer, the contents of which may be used to improve stability and convergence during training of the NN.

At step 2, the neural network weights θ⁻ and θ⁺ are initialized.

At step 3, the update frequency is initialized.

At step 4, an outer loop in initiated for all episodes, such as for a predefined number of episodes (e.g., 30, 300, 300, etc.) where each episode comprises a number of steps representing a sequence of states, actions and rewards ending in a terminal state.

At steps 5-13, a first inner loop is used to execute a first state-action value function Q(s, a; θ) that is shared by all of the relays and enables each of the relays to learn its own individual motion policy independent of the other relays. Specifically, the execution of the first inner loop comprises for each relay the current and possible states s of the relay being processed by a first MLP NN $Q_{policy}(s, a; \theta^+)$ ∀a to generate thereby a number of tuples of experience; namely, {state, action, nextstate, reward}≡{s, a, s', r}, for storage in the ER memory buffer. It is noted that at optional step 8, an adjustable percentage μ is subtracted from the result of step 7 to ensure that decisions other than staying are taken only of they are sufficiently beneficial to be worth the energy expenditure.

Steps 5-13 provide a first Q network denoted as a Policy Network, comprising a MLP trained to map coordinates to a low-dimensional signal, namely the state-action value function Q(s, a). The Q function, Q(s, a), quantifies the expected cumulative sum of $V_1$s that the relay is going to aggregate in the long run, starting from the respective position s and performing action a.

At step 14, a batch of tuples {s, a, s', r} from the ER memory buffer are sampled.

At steps 15-23, a second inner loop is used to execute a second state-action value function Q(s', a'; θ_t) that provides an estimate at every update step used to modify a gradient descent 𝓛 used to update the neural network weights θ⁺ at the end of the current episode.

Steps 15-22 provide a second Q network denoted as a Target Network, comprising a MLP trained to provide a Q(s', a'; θ_t) estimate at every update step. It is noted that in various embodiments, the Target Network ($Q_{target}(s', a'; \theta^-)$) has the same architecture as the Policy Network ($Q_{policy}(s', a'; \theta^+)$).

At step 24, the current episode ends.

Deep Q Learning with Fourier Features

To avoid/reduce spectral bias, various further provide a Fourier feature mapping of the input vector coordinates that transforms the effective Neural Tangent Kernel (NTK) of the MLP to a stationary kernel with a tunable spectral falloff and enables the network to learn to represent a signal with richer frequency spectrum. They demonstrated the performance of Fourier feature mapping in computer vision and computer graphics-related tasks.

Specifically, the various plain deep Q learning approaches for relay motion control discussed above are enhanced in various embodiments using Fourier feature mapping. The Policy Network is an MLP, trained to map coordinates to a low-dimensional signal, namely the state-action value function Q(s, a). The Q function, Q(s, a), quantifies the expected cumulative sum of $V_1$s that the relay is going to aggregate in the long run, starting from the respective position s and performing action a. The Policy Network may not be able to adequately track the high variability of the Q function stemming from the high variability of the channel magnitude with respect to time and space.

A further embodiment proposes to apply a Fourier feature transformation on the state (either s or s') before passing it to the Q networks (Policy Network or Target Network), i.e, $$s=[x,y]^T \mathbb{R}^2 \rightarrow v=[\cos(2\pi Bs), \sin(2\pi Bs)]^T \in \mathbb{R}^{2M}, \quad \text{(eq. 35)}$$

where → denotes transformation, $B \in \mathbb{R}^{M \times 2}$ is a transformation matrix, populated by elements drawn from $\mathcal{N}(0, \sigma^2)$.

The operations cos(•) and sin(•) in (35) are applied element-wise. The variance $\sigma^2$ controls the eigenvalue spectral fall off for the transformed NTK of the deep Q network. A very small σ results in underfitting. On the other hand, a too large σ would result, typically, in overfitting, with the network learning a very noisy version of the Q function and resulting in SINR at the destination that oscillates a lot in the course of the simulation. Let us refer to the above described approach as DQL-FFM, which stands for Deep Q Learning with Fourier Feature Mapping of the state.

FIG. 4 depicts a flow diagram of a method according to various Deep Q Learning with Fourier Feature Mapping of the state embodiments. Specifically, the control flow of the DQL-FFM embodiments are depicted in FIG. 4 and shown in Algorithm 2, as follows.

| | |
|---|---|
| 1. | Initialize Experience Replay (ER) |
| 2. | Initialize $\theta^+$ and $\theta^-$ |
| 3. | set update frequency |
| 4. | Initialize $B \in \mathbb{R}^{M \times 2}$ with $[B]_{ij} \sim \mathcal{N}(0, \sigma^2)$ |
| 5. | for all episodes do |
| 6. |   for all relays do |
| 7. |     Feature Mapping: |
| 8. |       $v = v(s) = [\sin(2\pi Bs), \cos(2\pi Bs)]^T$ |
| 9. |     input v to $Q_{policy}$ |
| 10. |     get $Q_{policy}(v, a; \theta^+) \forall a$ |
| 11. |     subtract $\mu = 1\%$ from $Q_{policy}(v, a; \theta^+) \forall a \neq$ stay |
| 12. |     $\epsilon$-greedy choice of a, respecting grid boundaries and priority |
| 13. |     observe next state s' and reward r |
| 14. |     store $\{s,a,s',r\}$ to ER |
| 15. |     s = s' |
| 16. |   end for |
| 17. |   sample a batch of tuples $\{s,a,s',r\}$ from ER |
| 18. |   for all tuples in the batch do |
| 19. |     Feature Mapping: |
| 20. |       $v = v(s) = [\sin(2\pi Bs), \cos(2\pi Bs)]^T$ |
| 21. |     input v to $Q_{policy}$, get $Q_p = Q_{policy}(v, a; \theta^+)$ |
| 22. |     Feature Mapping: |
| 23. |       $v' = v(s') = [\sin(2\pi Bs'), \cos(2\pi Bs')]^T$ |
| 24. |     input v' to $Q_{target}$, get $Q_t = Q_{target}(v', a'; \theta^-)$ |
| 25. |     $\mathcal{L} = (Q_p - (r + \gamma \max_a Q_t))^2$ |
| 26. |     update $\theta^+$ with gradient descent on $\mathcal{L}$ |
| 27. |     if steps% update frequency == 0 |
| 28. |       then copy the weights: $\theta^+ \rightarrow \theta^-$ |
| 29. |     end if |
| 30. |   end for |
| 31. | end for |

Deep Q Learning with Sinusoidal Representation Networks

There are many classes of problems where traditional MLPs fail to perform adequately, one of which corresponds to tasks where a neural network is employed to learn a mapping, where the input is a coordinate vector and the target is a low-dimensional natural signal that possesses high frequencies (i.e., the neural network is trained to map coordinates of the pixels to the RGB values for a single high-resolution image). For those problems, a neural network architecture for those problems is proposed, that corresponds to a typical feed forward network with dense layers but the activation function for every layer is a sinusoid ($\sin(\bullet)$). The architectural scheme was termed Sinusoidal Representation Networks (SIRENs), and was shown to massively outperform the traditional coordinate-based MLPs with Rectified Linear activations. The performance of SIRENs heavily depends on the initialization of the weights of each network layer in order to preserve the distribution of activations through the network, during training.

Assuming an intermediate layer with input $x \in \mathbb{R}^n$, then taking a linear combination of the input weighted with w, the output is $\sin(w^T x + b)$. Since the layer is intermediate, the input x is arcsine distributed. With these assumptions, if the elements of w, namely $w_i$, are initialized from a uniform distribution $$w_i \sim \mathcal{U}\left(-\sqrt{\frac{6}{n}}, \sqrt{\frac{6}{n}}\right),$$

then $w^T x \sim \mathcal{N}(0,1)$ as n grows. Therefore one should initialize the weights of all intermediate layers with $$w_i \sim \mathcal{U}\left(-\sqrt{\frac{6}{n}}, \sqrt{\frac{6}{n}}\right).$$

The neurons of the first layer are initialized with the use of a scalar hyperparameter $\omega_0$, so that the output of the first layer, $\sin(\omega_0 Wx+b)$ spans multiple periods over $[-1,1]$. W is a matrix whose elements correspond to the weights of the first network layer.

Again, the embodiments use an adaptation of this concept for the problem of deep Q learning for relay motion control, because the Policy Network is a function approximator for a low-dimensional target signal (essentially, maps coordinates to the Q values). The MLP might not be able to track the high variability of the Q function that derives from the high variability of the channel magnitude with respect to time and space. The algorithm proposed has the same control flow as the one presented in Algorithm 1 with the only differentiation being that both the Policy Network and the Target Network are SIRENs. This embodiment is denoted as DQL-SIREN, which stands for Deep Q Learning with Sinusoidal Representation Networks.

Illustrative System

Figure 2:
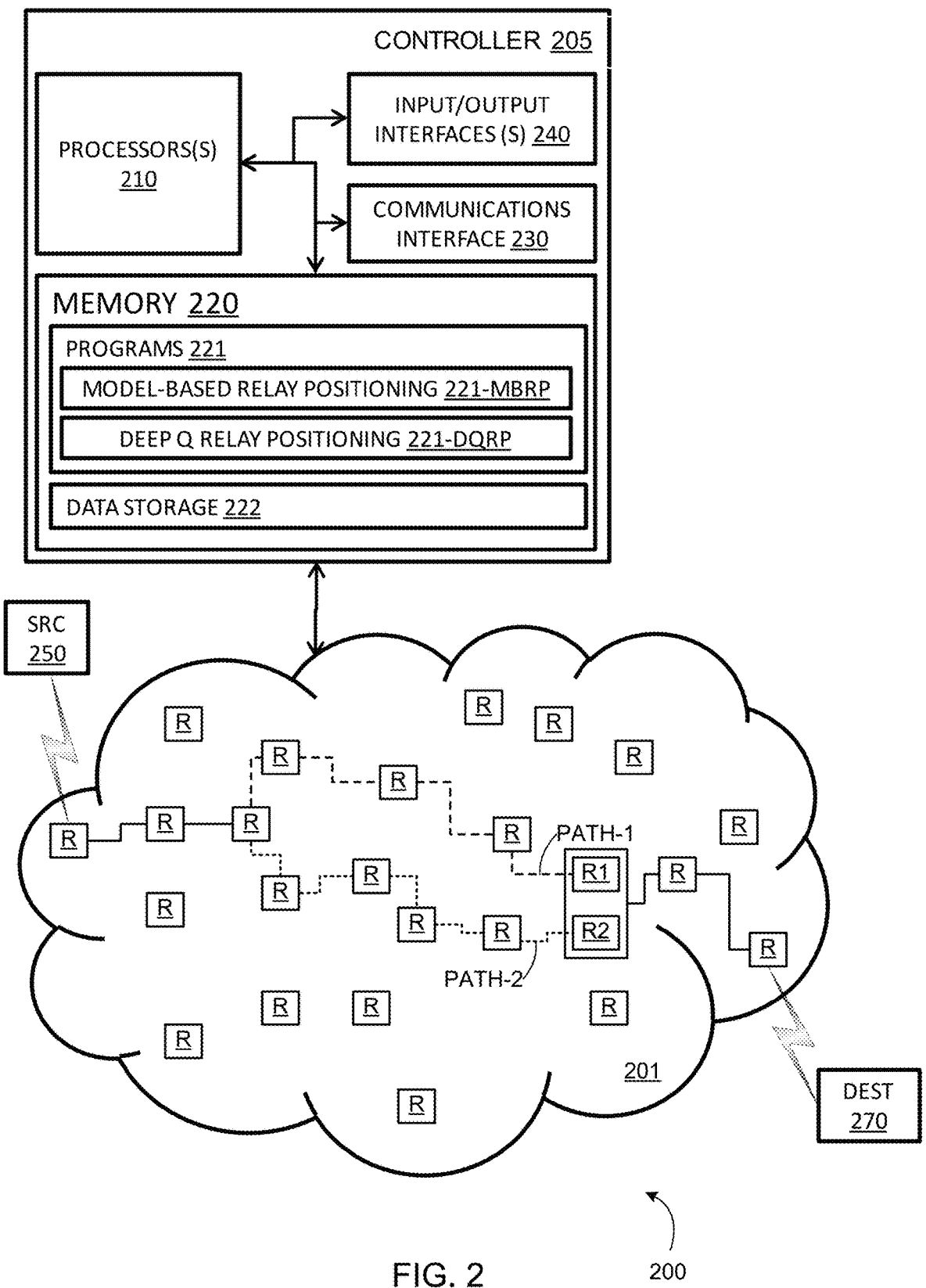
FIG. 2 depicts a high-level block diagram of a system according to various embodiments.

FIG. 2 depicts a high-level block diagram of a system according to various embodiments. The system 200 of FIG. 2 depicts an illustrative embodiment wherein a plurality of relays R within a network or group or cluster of relays 201 are configured by a controller 205 to support a communications path between a source device SRC 250 and a destination device DEST 270.

Generally speaking, the controller 205 is configured to perform various processing operations such as described elsewhere in this specification with respect to the various embodiments, figures (e.g., FIGS. 3-4), equations, and the like so as to determine, illustratively, appropriate relays R supporting a path between the source 250 and destination 270 devices. For purposes of this example, it is assumed that the relays R generally move within a two dimensional or substantially planar space (e.g., on the ground, at street level, within the same floor of a building, etc.) or a three dimensional space projected upon a two dimensional space of interest. In various embodiments, the controller improves system resilience and survivability by being configured to identify a primary path and a secondary path, wherein the primary path is used until such time as it fails (e.g., SNR or SINR drops or is predicted to imminently drop below a threshold amount). The controller 205 may further implement a fail-over routing so as to migrate the a source/destination communication from a primary path to a secondary path. Various other embodiments will also be discussed.

As shown in FIG. 2, the controller 205 is configured in a particular manner in terms of hardware, software stored upon or executed by hardware, input/output resources, connected devices/functions and the like. However, it will be appreciated by those skilled in the art that the controller 205 may be configured according to any one of a number of computing topologies or configurations. That is, the controller 205 may comprise a general purpose computer, a special purpose computer, a specific type of server and/or any other computing device capable of performing the various functions described herein. Thus, the controller 205 as described herein with respect to FIG. 2 may also be implemented as a general purpose computing device, such as a server, workstation, data center, virtualized computing environment, or other computing device, system, and/or environment implementing a controller 205 operating in accordance to the various embodiments, such as described herein and with respect to the various other figures. The controller 205 is architected to execute various computing structures compatible with the embodiments, such as computing structures capable of supporting neural network processing, pipelining, and the like.

As depicted in FIG. 2, the controller 205 includes one or more processors 210, a memory 220, a communications interface 230 and input-output (I/O) interface(s) 240. The processor 210 is coupled to each of memory 220, communication interfaces 230, and I/O interfaces 240.

The processor(s) 210 are configured for controlling the operation of controller 205, including operations supporting the methodologies described herein with respect to the various embodiments. Similarly, the memory 220 is configured for storing information suitable for use by the processor(s) 210. Specifically, memory 220 may store programs 221, data 222 and so on. Within the context of the various embodiments, the programs 221 and data 222 may vary depending upon the specific functions implemented by the controller 205. For example, as depicted in FIG. 2, the programs portion 221 of memory 220 includes at least one of the functional modules denoted as follows: a model-based relay positioning engine 221-MBRP (configured to implement any of the model-based relay motion embodiments discussed in this specification), and a deep Q relay positioning engine 221-DQRP (configured to implement any of the deep Q learning-based relay motion embodiments discussed in this specification).

Generally speaking, the memory 220 may store any information suitable for use by the controller 205 in implementing one or more of the various methodologies or mechanisms described herein. It will be noted that while various functions are associated with specific programs or databases, there is no requirement that such functions be associated in the specific manner. Thus, any implementations achieving the functions of the various embodiments may be used.

The communications interfaces 230 may include one or more services signaling interfaces such as a Wi-Fi or WiMAX interface, a 3G wireless interface, a 4G/LTE wireless interface, a 5G wireless interface, an Ethernet interface and the like for supporting data/services signaling between controller 205 and the network 201 or relays R. It will be appreciated that fewer or more, as well as different, communications interfaces may be supported. The various communications interfaces 130 are adapted to facilitate the transfer of information, files, data, messages, requests and the like between various entities in accordance with the embodiments discussed herein.

The I/O interface 140 may be coupled to one or more presentation devices (not shown) such as associated with display devices for presenting information to a user, one or more input devices (not shown) such as touch screen or keypad input devices for enabling user input, and/or interfaces enabling communication between the controller 105 and other computing, networking, presentation or other local or remote input/output devices (not shown).

Various embodiments are implemented using a controller 205 comprising processing resources (e.g., one or more servers, processors and/or virtualized processing elements or compute resources) and non-transitory memory resources (e.g., one or more storage devices, memories and/or virtualized memory elements or storage resources), wherein the processing resources are configured to execute software instructions stored in the non-transitory memory resources to implement thereby the various methods and processes described herein. As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

It is contemplated that some of the steps discussed herein as software methods may be implemented within special-purpose hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a broadcast or other tangible signal-bearing medium, and/or stored within a memory within a computing device operating according to the instructions.

Although primarily depicted and described as having specific types and arrangements of components, it will be appreciated that any other suitable types and/or arrangements of components may be used for controller 105.

For example, the controller 205 in whole or in part may be implemented within one or more data centers comprising compute resources (e.g., processing resources such as provided by one or more servers, processors and/or virtualized processing elements or other compute resources), memory resources (e.g., non-transitory memory resources such as one or more storage devices, memories and/or virtualized memory elements or storage resources), input/output (I/O) and communications/network interface resources, and/or other hardware resources and/or combined hardware and software resources suitable for use in implementing a plurality of virtualized machines such as those configured to implement the functions described herein with respect to the controller 205. Various other types of virtualized services platforms, servers, and other known systems may be used to implement the virtualized network management elements such as described herein. The compute or processing resources may also be configured to execute software instructions stored in the non-transitory memory resources to provide thereby the various relay motion control functions, communications path functions, and/or other functions as described herein.

Example Grid and Movement Specifications

For simulation purposes, a 20×20 meter grid is assumed, wherein the grid cells are of equal size, with the spacing between their centers set to $\delta=1$ meter. An exemplary case of R=3 relays is considered, such as depicted in FIG. 1. As mentioned before, at every time instance the relay movement is ensured to be constrained withing the grid boundaries and according to the assigned relays' movement priority. Only one relay can occupy a grid cell per time slot, positioned at the center of each grid cell.

For an assumed shadowing correlation model of (eq. 9), let us consider a threshold $\theta$, which determines the level at which the shadowing correlation is considered to not be strong, and therefore cannot be exploited for learning or prediction. In a measurement campaign it is determined, for a LoS scenario over an urban street, the area over which the statistics of a millimeter wave propagation channel do not change. Assuming a threshold $\theta=1/e$, it is found that the standard deviation of shadowing was 3.11 dB ($\approx$2), so the shadowing power $\eta^2=4$, and their measured autocorrelation distance was $c_1=1.2$ m.

In these simulations, it is assumed that the relays move 1 cell/time slot, so the cell size is set to 1 m and the time slot length is 0.6 sec. Within those 0.6 sec the relays must estimate their channels, decide on their movements, and move. Operationally, channel estimation and movement should utilize the bare minimum duration of the time slot while the computationally involved movement decision, the rest.

Example Specifications for the Deep Q Networks and the Training Process

Regarding the plain deep Q with energy preservation and the DQL-FFM methods, various embodiments use an MLP for the Policy Network (and one for the Target Network correspondingly). The architecture consists of 3 dense layers (512 neurons for each layer) and the Rectified Linear function as activation for all the layers, except for the last one, where no activation is implemented. The learning rate is set to 1e-3. Regarding the DQL-SIREN method, various embodiments employ a SIREN (as described in Section 4.4) for the Policy Network (and the Target Network correspondingly). It consists of 3 layers (350 neurons for each layer) and the learning rate is fixed at 1e-4. The size of the Experience Replay is set to, illustratively, 3000 tuples and initialized with 300 tuples from a random policy at the beginning of every experiment, for some or all embodiments. The $\in$ of the $\in$-greedy policy is initialized to 1 but quickly, in the course of the experiment, drops to 0.1. This is a standard practice in RL, that promotes exploration at the beginning and gradually trades exploration for exploitation. The weights of the Policy Network may be copied to the weights of the Target Network every, illustratively, 40 update steps (more or fewer steps in various embodiments). The batch size is, illustratively, 128 (larger or smaller in various embodiments) and the discount factor $\gamma$ is fixed at, illustratively, 0.99 (larger or smaller in various embodiments) The matrix B for the DQL-FFM is, illustratively, 4×2 and its elements are drawn from a Gaussian with zero mean and $\sigma=0.002$ and the $\omega_0$ for the DQL-SIREN is set to 5 (it was noticed that choosing any integer value in the range [3,10] for $\omega_0$ works relatively well for DQL-SIREN, but 5 seems the better performing choice in some embodiments). Finally, an Adam optimizer is used as the iterative optimization scheme for updating the Policy Network's weights for all the deep Q learning methods.

Example Synthesized Data and Simulations

Using synthetically generated CSI data, according to the statistical description of the log-channel (see prior discussion in "channel model selection"), an examination is made of the performance of exemplary embodiment relay control schemes. The system performance of the model based and model-free approaches is compared against a random policy.

Figure 5:
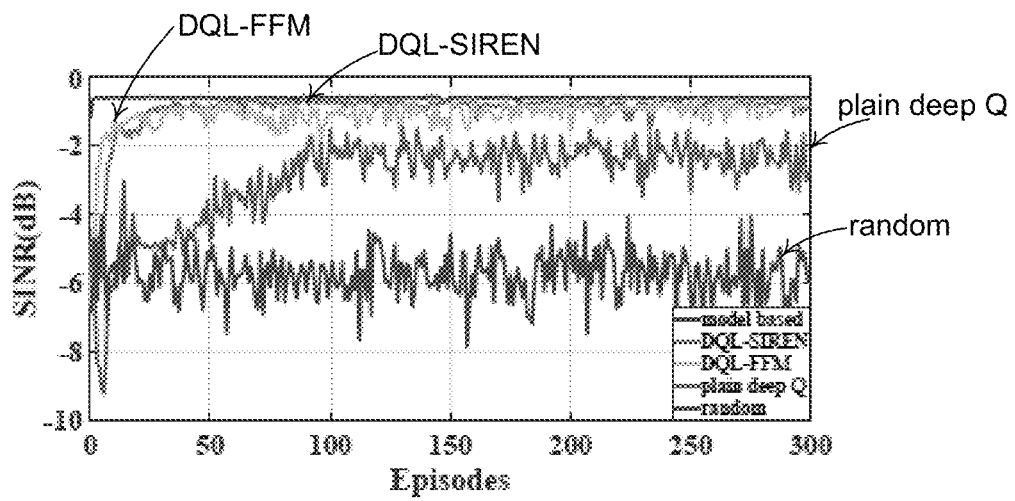
FIG. 5 graphically depicts a comparison of various proposed deep Q methods, the model based method and a random policy, FIG. 6 graphically depicts a comparison of an exemplary deep Q method to a model based method where a channel magnitude is lowered for 3 favorable cell positions on the grid.

FIG. 5 graphically depicts a comparison of various proposed deep Q methods, the model based method and a random policy, resulting in a plot of the average SINR per episode achieved by the relays at the destination for 300 episodes (400 slots per episode). In particular, system performance of all motion control methods is plotted. We plot the average SINR at the destination (in dB scale) achieved by the cooperation of all 3 relays, per episode, for 300 episodes, where every episode is comprised by 400 steps. The transmission power of the source is $P_S=43$ dbm and the relay transmission power budget is $P_R=55$ dBm. The assumed channel parameters are set as $\ell=2.3$, $\rho=3$, $\eta^2=4$, $\sigma_\xi^2=3$, $c_1=1.2$, $c_2=0.6$, $c_3=0.5$. The variance of the noise at the relays and destination are $\sigma_D^2=\sigma^2=0.5$. We can infer that both the Fourier feature mapping and the employment of SIRENs have a significant effect on the speed of convergence and on the resulting policies, comparing to the plain deep Q learning with energy preservation. The performances of the DQL-FFM and the DQL-SIREN are almost the same as the performance of the model based approach, with the DQL-SIREN performing slightly better between the two. There is a small gap between the model based and the two deep Q approaches (where the model based approach is slightly better). This gap, most likely, exists because the deep Q learning approaches, do maintain exploration for the whole course of the experiment to adapt to any changes in the channels, by keeping the $\in$ of the $\in$-greedy policy nonzero for all times. Therefore, the relays do not choose the optimal action a small percentage of the time. This percentage is controlled by the value of $\in$. In this case, in all experiments $\in$ is being decreased until the value of 0.1. We should note, at that point, that the performance of the DQL-SIREN is similar, if not slightly better than, the performance of the DQL-FFM, but the size of the model for the former method is (therefore the computational load and the memory needs) significantly smaller than for the latter method (350 neurons per layer for the DQL-SIREN and 512 neurons per layer for the DQL-FFM).

Example Simulations with Channel Model Mismatch

Figure 6:
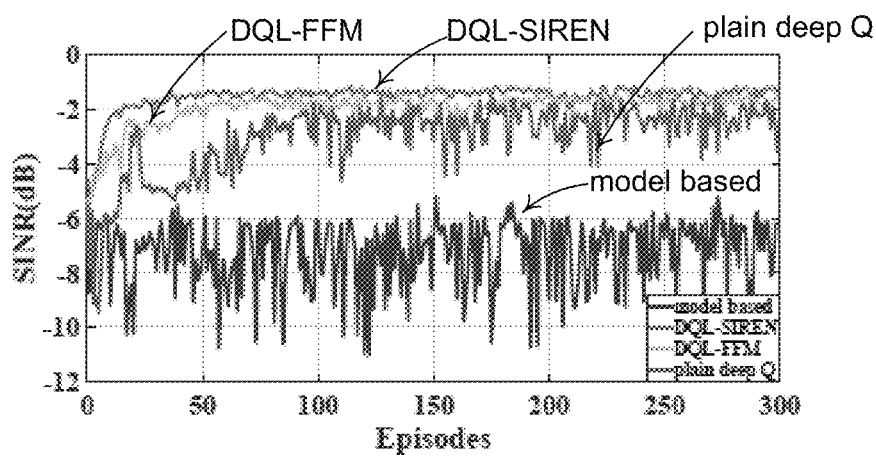

The small gap in performance between the model based approach and the variations of the deep Q methods that mediate the spectral bias (namely the DQL-FFM and the DQL-SIREN), that was prevalent in the previous subsection and results from the continuous exploration employed in the deep Q, pays dividends, in terms of adaptability, in situations where the channel data of the grid cells deviate slightly from the channel model as previously discussed. This is illustrated by performing the same simulations as in the previous subsection, but with, illustratively, a lower the channel magnitude in 3 cells in the grid by 90% for all the 400 time slots of the episode and for all 300 episodes. The coordinates of these grid cells are [19,9],[19,10],[19,11] and correspond to positions where the 3 deep Q approaches and the model based approach often converge near to. The results are shown in FIG. 6, which graphically depicts a comparison of an exemplary deep Q method to a model based method where a channel magnitude is lowered for 3 favorable cell positions on the grid, resulting in a plot of the average SINR that the relays achieve at the destination per episode for 300 episodes (400 slots per episode). All the deep Q learning methods adapt on this new grid by avoiding these compromised positions and achieve high average collective SINR at the destination, in contrast to the model based method which, essentially, crashes. The performance of the DQL-SIREN is noticeably better than the performance of the other 2 deep Q approaches.

Discussion on the Selection of B Matrix for the DQL-FFM

The performance of the DQL-FFM is heavily dependent on the selection of the B matrix as it is defined in (eq. 35). B greatly affects the spectral falloff for the resulting NTK of the Q network (MLP) and, therefore the spectrum of the low dimensional signal that is being represented (Q function). What was observed in simulations is that, perhaps contrary to intuition, the elements of the B matrix cannot be learned with gradient descent (as part of the neural network training process). The elements of B may be selected by sweeping over the variance of the zero-mean Gaussian that was sampled from. At least, this is the strategy when there is no strong prior knowledge for the spectrum of the target signal. In principal, the higher the variance $\sigma^2$ of the Gaussian distribution that the elements of B are sampled from, the slower the spectral falloff of the resulting NTK, therefore the MLP converges faster for the high frequency components of the Q function. But if $\sigma^2$ is too large and has a really slow spectral falloff then overfitting occurs. The network, basically learns a depiction of the Q function using polynomials of very high order, not justified by the task at hand. This results in a very noisy Q function and in low-performance policies. In any case, the choice of $\sigma$ is crucial for achieving both fast convergence and high-reward motion policies. An observation that can also be made is that there is an inverse relation between the network's depth and the $\sigma$ of the Gaussian. Deeper Q networks "demand" B matrices with elements that are sampled from zero-mean Gaussian distributions with smaller variances. One would be able to achieve adequate performance by performing a simpler mapping, where the input coordinates (state) are wrapped around the unit circle (36)

$$s=[x,y]\in \mathbb{R}^2 \to v=[\cos(2\pi s), \sin(2\pi s)] \in \mathbb{R}^4, \quad (36)$$

Figure 7:
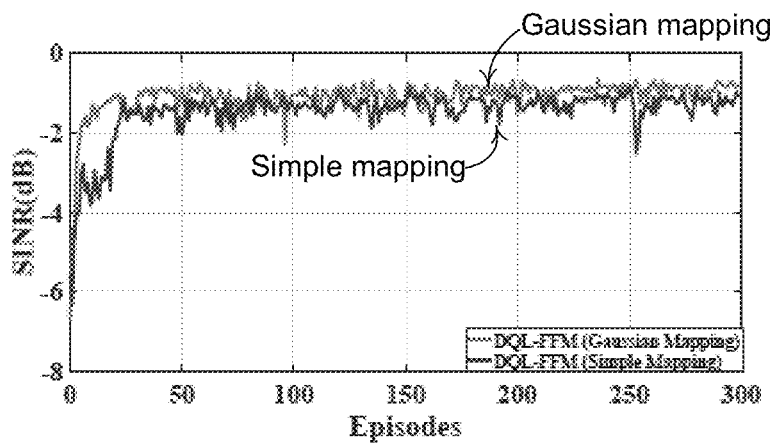
FIG. 7 graphically depicts a comparison of an exemplary deep Q method with simple Fourier mapping on the state to a deep Q method with Gaussian Fourier mapping of the state.

FIG. 7 graphically depicts a comparison of an exemplary deep Q method with simple Fourier mapping on the state to a deep Q method with Gaussian Fourier mapping of the state, resulting in a plot of the average SINR that the relays achieve at the destination per episode for 300 episodes (400 slots per episode). Specifically, FIG. 7 presents the comparison in performance between the DQL-FFM with the simple mapping and the DQL-FFM with the mapping using the Gaussian matrix B (Gaussian mapping). The performances are close, but the method with the Gaussian mapping slightly outperforms the one with the simple mapping, both in terms of convergence and in terms of the average SINR per episode collectively achieved by the relays at the destination.

Comparison of the Control Methods

An important takeaway from the experiments is that the model based method is highly sensitive to the assumptions for the statistics of the channel, which makes it less robust and adaptive to deviations of the channel magnitude data from the assumed correlation structure. This is not the case for the deep Q learning methods that are highly adaptive.

Another important point to be made is the fact that, when MLPs are employed for Q function approximation for the grid based relay motion control, the inability of MLPs to converge for high frequencies of the Q signal impedes performance. The problem specific remedies that are proposes herein and address the aforementioned inadequacy and provide significant improvements, both in convergence and in the quality of the learned policies.

Amongst the deep Q learning variations, the DQL-SIREN approach slightly outperforms the DQL-FFM with the Gaussian mapping, in terms of the cumulative SINR achieved at the destination and requires a significantly smaller number of parameters to be learned. On the other hand, DQL-FFM exhibits, in general, faster convergence. Both methods require careful tuning of hyperparameters and are relatively sensitive to those choices ($\omega_0$ for the DQL-SIREN and B for the DQL-FFM with the Gaussian mapping). If one would tolerate a slight compromise in terms of overall performance, they would be able to choose the DQL-FFM with the simple mapping, where the required tuning of hyperparameters is less intensive.

Thus, the various embodiments address the posed the problem of relay motion control for relay beamforming networks in spatiotemporally correlated environments in a sequential decision-making framework, where the goal is to maximize the expected cumulative SINR at the destination. Various embodiments have employed multiple RL approaches to solve it and tested these approaches on data, synthesized based on a model for channel correlations. The approaches various embodiments employ consist of a model based method, and two variations of a model free deep Q learning method. For the deep Q learning methods, various embodiments have employed MLPs for the approximation of the Q function corresponding to the relay motion, and proposed remedies to address the spectral bias issue. We have shown that these approaches massively improve the speed of convergence and the achieved reward per episode. Overall, the experiments suggested that the deep Q learning methods are, in general, more adaptable and robust with regards to the problem at hand. Amongst the deep Q learning variations, the approach that applies a Fourier feature mapping on the state with a properly tuned Gaussian matrix, and the approach that employs SIRENs for the Q function approximation achieve the best overall performance. The two approaches are very similar in performance but the latter is more economical in terms of computational effort and memory consumption. Overall, it is prevalent that the spectral bias of MLPs negatively impacts the process of Q function approximation for the grid-based motion control of the relays. Effectively tackling this issue reaps great benefits for performance.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A computer implemented method for determining a subsequent time slot position for each of a plurality of spatially distributed relays configured for time slot based beamforming supporting a communication channel between a source and a destination, the method comprising:
for each of a plurality of update steps, using a neural network receiving relay coordinates s as input for estimating a state-action value function Q(s, a; θ) for each relay wherein a displacement action a for each relay is selected with respect to a communication channel objective maximization step over the estimates of the neural network, the application of the selected displacement action a for each relay generating a {state, action, nextstate, reward} tuple for storage in an experience replay (ER) memory buffer, wherein uniform sampling of tuples stored in the ER memory buffer is used to update neural network weights for subsequent selection of displacement action a for each relay to improve neural network decision quality;
wherein, for each of the plurality of update steps, a second neural network Q(s', a'; $\theta_t$) is used to provide an estimated value associated with the communication channel objective being maximized by processing a portion of the stored {state, action, nextstate, reward} tuples.

2. The computer implemented method of claim 1, wherein neural network decision quality is improved by reducing spectral bias.

3. The computer implemented method of claim 1, wherein the communication channel objective comprises a signal-to-noise ratio (SNR) of the communication channel.

4. The computer implemented method of claim 3, wherein using a first neural network for processing relay coordinates according to a first state-action value function Q(s, a; θ) comprises for each relay further performing the steps of:
∈-greedy choice of a, respecting grid boundaries and priority.

5. The computer implemented method of claim 3, wherein using a first neural network for processing relay coordinates according to a first state-action value function Q(s, a; θ) comprises for each relay further performing the steps of:
subtract μ=1% from $Q_{policy}$(S, a; θ⁺)∀a≠stay.

6. The computer implemented method of claim 1, wherein the communication channel objective comprises a signal-to-interference+noise ratio (SINR) of the communication channel.

7. The computer implemented method of claim 1, further comprising:
initializing the ER memory buffer;
initializing first neural network weights θ⁻ and θ⁺; and
defining a number of update steps;
wherein using a first neural network for processing relay coordinates according to a first state-action value function Q(s, a; θ) comprises for each relay performing the steps of:

```
input s to Q_policy
get Q_policy(s, a; θ⁺) ∀a
observe next state s' and reward r
store {s,a,s',r} to ER
s = s'.
```

8. The computer implemented method of claim 1, wherein said estimating a state-action value function Q(s, a; θ) further comprises applying a Fourier feature mapping of the state before passing it through the MLP.

9. The computer implemented method of claim 1, wherein said estimating a state-action value function Q(s, a; θ) further comprises applying a neural network architecture that uses sinusoids as activations between layers.

10. Apparatus for determining a subsequent time slot position for each of a plurality of spatially distributed relays configured for time slot based beamforming supporting a communication channel between a source and a destination, the apparatus comprising compute and memory resources configured to perform the steps of:
for each of a plurality of update steps, using a neural network receiving relay coordinates s as input for estimating a state-action value function Q(s, a; θ) for each relay wherein a displacement action a for each relay is selected with respect to a communication channel objective maximization step over the estimates of the neural network, the application of the selected displacement action a for each relay generating a {state, action, nextstate, reward} tuple for storage in an experience replay (ER) memory buffer, wherein uniform sampling of tuples stored in the ER memory buffer is used to update neural network weights for subsequent selection of displacement action a for each relay to improve neural network decision quality;
wherein, for each of the plurality of update steps, a second neural network Q(s', a'; $\theta_t$) is used to provide an estimated value associated with the communication channel objective being maximized by processing a portion of the stored {state, action, nextstate, reward} tuples.

11. The apparatus of claim 10, wherein neural network decision quality is improved by reducing spectral bias.

12. The apparatus of claim 10, wherein the communication channel objective comprises a signal-to-noise ratio (SNR) of the communication channel.

13. The apparatus of claim 12, wherein using a first neural network for processing relay coordinates according to a first state-action value function Q(s, a; θ) comprises for each relay further performing the steps of:
∈-greedy choice of a, respecting grid boundaries and priority.

14. The apparatus of claim 12, wherein using a first neural network for processing relay coordinates according to a first state-action value function Q(s, a; θ) comprises for each relay further performing the steps of:
subtract μ=1% from $Q_{policy}$(s, a; θ⁺)∀a≠stay.

15. The apparatus of claim 10, wherein the communication channel objective comprises a signal-to-interference+noise ratio (SINR) of the communication channel.

16. The apparatus of claim 10, further configured to perform the steps of:
initializing the ER memory buffer;
initializing first neural network weights θ⁻ and θ⁺; and
defining a number of update steps;
wherein using a first neural network for processing relay coordinates according to a first state-action value function Q(s, a; θ) comprises for each relay performing the steps of:

```
input s to Q_policy
get Q_policy(s, a; θ⁺) ∀a
observe next state s' and reward r
store {s,a,s',r} to ER
s = s'.
```

17. The apparatus of claim 10, wherein said estimating a state-action value function Q(s, a; θ) further comprises applying a Fourier feature mapping of the state before passing it through a Multilayer Perceptron (MLP) Neural Network.

18. The apparatus of claim 10, wherein said estimating a state-action value function Q(s, a; θ) further comprises applying a neural network architecture that uses sinusoids as activations between layers.

19. A tangible and non-transitory computer readable storage medium storing instructions which, when executed by a computer, adapt the operation of the computer to provide a method for determining a subsequent time slot position for each of a plurality of spatially distributed relays configured for time slot based beamforming supporting a communication channel between a source and a destination, the method comprising:
  for each of a plurality of update steps, using a neural network receiving relay coordinates s as input for estimating a state-action value function Q(s, a; θ) for each relay wherein a displacement action a for each relay is selected with respect to a communication channel objective maximization step over the estimates of the neural network, the application of the selected displacement action a for each relay generating a {state, action, nextstate, reward} tuple for storage in an experience replay (ER) memory buffer, wherein uniform sampling of tuples stored in the ER memory buffer is used to update neural network weights for subsequent selection of displacement action a for each relay to improve neural network decision quality;
  wherein, for each of the plurality of update steps, a second neural network Q(s', a'; $\theta_t$) is used to provide an estimated value associated with the communication channel objective being maximized by processing a portion of the stored {state, action, nextstate, reward} tuples.

* * * * *